(12) United States Patent
Zwaga

(10) Patent No.: US 11,691,778 B2
(45) Date of Patent: Jul. 4, 2023

(54) CARDBOARD TRAY

(71) Applicant: Stackpack B.V., Almelo (NL)

(72) Inventor: Ronald Zwaga, Almelo (NL)

(73) Assignee: Stackpack B.V., Almelo (NL)

( * ) Notice: Subject to any disclaimer, the term of this patent is extended or adjusted under 35 U.S.C. 154(b) by 134 days.

(21) Appl. No.: 16/982,820

(22) PCT Filed: Mar. 18, 2019

(86) PCT No.: PCT/EP2019/056684
§ 371 (c)(1),
(2) Date: Sep. 21, 2020

(87) PCT Pub. No.: WO2019/179930
PCT Pub. Date: Sep. 26, 2019

(65) Prior Publication Data
US 2021/0053714 A1      Feb. 25, 2021

(30) Foreign Application Priority Data
Mar. 22, 2018 (EP) .................................... 18163496

(51) Int. Cl.
*B65D 5/20* (2006.01)
*B65B 7/16* (2006.01)
(Continued)

(52) U.S. Cl.
CPC ............ *B65D 5/2047* (2013.01); *B65B 7/164* (2013.01); *B65D 5/243* (2013.01); *B65D 77/2024* (2013.01)

(58) Field of Classification Search
CPC .. B65D 5/2047; B65D 5/243; B65D 77/2024; B65D 21/0233; B65D 5/246;
(Continued)

(56) References Cited

U.S. PATENT DOCUMENTS 2,944,721 A      7/1960   Choate
3,154,215 A  *  10/1964   Levesconteed ....  B65D 21/0233
                                                              220/640
(Continued)

FOREIGN PATENT DOCUMENTS

CA     2294630 A1 *  10/1999
DE     3026080 A  *   2/1981   ........... B65D 5/2038
(Continued)

OTHER PUBLICATIONS

Plegaservice Center, "Bibliographic information for "CE1000 Falt2b"", https://www.youtube.com/watch? v=Mn91pnn8F10, 2014, pp. 1-2.

*Primary Examiner* — Christopher R Demeree
(74) *Attorney, Agent, or Firm* — The Webb Law Firm

(57) ABSTRACT

A cardboard tray folded from an unfolded sheet of cardboard includes: a bottom wall with a circumferential edge formed out of an even number of straight edges; wall parts each arranged to a straight edge of the bottom wall; and first flange parts alternately arranged to subsequent wall parts along the circumferential edge. The first flange parts include at least a first, a second, and a third elongate flange part section, which are connected parallel and along an elongate edge to each other. The first elongate flange part section is arranged to the respective wall part, the third elongate flange part section is connected parallel and along an elongate edge to the second elongate flange part section, the third elongate flange part section is adhered to the outside of the respective wall part, and the second flange part section is double folded against the first flange part section.

4 Claims, 6 Drawing Sheets

(51) Int. Cl.
*B65D 5/24* (2006.01)
*B65D 77/20* (2006.01)

(58) Field of Classification Search
CPC .......... B65D 5/443; B65D 1/34; B65B 7/164; B31B 2110/10; B31B 2105/00; B31B 2105/001; B31B 50/592; B31B 2120/40; B31B 2105/0024; B32B 15/12; B32B 27/10
USPC ........ 229/113, 114, 170, 171, 174; 206/518, 206/519, 503, 515, 557; 220/657; 493/93, 148, 52, 95; 428/172; 53/175, 53/452
See application file for complete search history.

(56) References Cited

U.S. PATENT DOCUMENTS

| | | | |
|---|---|---|---|
| 3,316,102 A | 4/1967 | Doll et al. | |
| 3,390,618 A * | 7/1968 | Mcardle | B29C 51/162 91/363 R |
| 4,056,221 A * | 11/1977 | Piltz | B65D 5/62 229/930 |
| 4,200,481 A * | 4/1980 | Faller | B29C 51/165 156/499 |
| 4,257,530 A * | 3/1981 | Faller | B65B 9/04 229/905 |
| 4,337,116 A * | 6/1982 | Foster | B32B 27/10 428/36.1 |
| 4,417,882 A | 11/1983 | Wallin | |
| 5,048,716 A * | 9/1991 | Bodet | B29C 51/162 229/407 |
| 5,253,801 A * | 10/1993 | Bernstein | B65D 5/2047 229/113 |
| 5,323,956 A * | 6/1994 | Marcontell | B65D 5/56 229/109 |
| 5,356,070 A * | 10/1994 | Rigby | B65D 5/48022 229/407 |
| 10,232,973 B2 * | 3/2019 | Burke | B65D 5/244 |
| 2001/0038031 A1 | 11/2001 | Le Bras | |
| 2009/0152333 A1 * | 6/2009 | Maeaettae | B29C 43/203 493/148 |
| 2010/0193578 A1 * | 8/2010 | Sanders | B65D 65/403 493/93 |
| 2011/0065556 A1 * | 3/2011 | Middleton | B29C 45/14336 493/52 |
| 2014/0131428 A1 * | 5/2014 | Balke | B65D 5/56 229/407 |
| 2016/0016685 A1 * | 1/2016 | Bauernfeind | B65D 5/603 206/557 |

FOREIGN PATENT DOCUMENTS

| | | |
|---|---|---|
| DE | 9202505 U1 | 6/1992 |
| EP | 2965997 A1 | 1/2016 |
| FR | 2302246 A1 | 9/1976 |
| WO | 0046111 A1 | 8/2000 |

* cited by examiner

CARDBOARD TRAY

CROSS-REFERENCE TO RELATED APPLICATIONS

This application is the United States national phase of International Application No. PCT/EP2019/056684 filed Mar. 18, 2019, and claims priority to Netherlands Patent Application No. 18163496.5 filed Mar. 22, 2018, the disclosures of which are hereby incorporated by reference in their entirety.

BACKGROUND OF THE INVENTION

Field of the Invention

The invention relates to a cardboard tray folded from an unfolded sheet of cardboard.

Description of Related Art

In the packaging industry there is trend to reduce the amount of plastics used in packaging. Currently, still a large amount of plastic trays are used to package vegetables, fruits and precooked meals. Some of the plastic trays are exchanged for cardboard trays, which are flow packed with foil.

With flow packed cardboard trays, the look and feel of the packaging still resembles more a plastic tray than a cardboard tray. As a result attempts are made to top seal a cardboard tray, such that only the opening of a cardboard tray is closed off by a seal foil.

In order to top seal a cardboard tray, a horizontal peripheral flange is provided along the access opening of the tray. Typically, the cardboard tray is folded out of a unfolded sheet. The flanges of such a tray are sheet parts folded into a horizontal plane to provide a circumferential horizontal flange. When a foil is top sealed onto this flange, the foil will tend to pull the flanges towards each other, such that the top seal foil is no longer under tension. As the top seal foil is no longer under tension, the top sealed cardboard trays cannot be stacked on top of each other.

A further disadvantage of the flanges being pulled towards each other is that the cardboard tray loses rigidity, which detracts from the look and feel of the packaging.

Connecting the flange parts of a cardboard tray is virtually impossible with current conical gluing systems, for example sold by the company Heiber and Schröder. Due to the weak flanges, which tend to fold back upwards, a magazine of gluing system cannot keep the flange parts of a folded tray in such position, that the flange parts can be adhered together.

Furthermore, overlapping flange parts are disadvantageous for top sealing a foil, which typically requires a flat horizontal circumferential flange, due to the difference in thickness of the flange part itself and the overlapping flange portion, which are twice as thick.

U.S. Pat. No. 2,944,721 discloses a cardboard tray folded from an unfolded sheet of cardboard. The cardboard tray comprises a top edge composed out of four elongate parts connected parallel to each other and to the top edge of the walls.

The first, second and third elongate parts provide in cross-section a triangular shape, while the fourth elongate part is adhered to the wall and secures the triangular shape in position.

Due to the triangular cross-section and because the top edge extends along the full circumference of the tray, a ridged top edge is provided, which does not allow for any flexibility. Furthermore, the top edge is not suitable to be provided with a top seal, as the top edge having the triangular cross-section is not suitable for arrangement in a top sealer.

SUMMARY OF THE INVENTION

Accordingly, it is an object of the invention to provide a cardboard tray, in which the above mentioned disadvantages are reduced or even removed.

For example, in trays for packaging fruit and vegetables, the top seal foil does not need to be adhered to a circumferential flange. When the foil is only adhered to the first flange parts and the top seal foil is tensioned due to the first, second and third flange part sections, then a suitable tray is obtained, which can be stacked and wherein the fruit and vegetables are contained.

Because the first flange parts are double folded flange part sections additional strength is obtained. Furthermore, the second flange part section is folded against the first flange part section and extends on both ends, such that the extending portions overlap with an adjacent second flange part of an adjacent wall part. As a result a circumferential flange is formed by alternately second flange parts and first flange part sections of the first flange parts. Because the extending portions of the second flange part sections, which are folded double and therefore offset over at least the thickness of the cardboard, provide the connection with the second flange parts of adjacent walls, a flat circumferential flange is obtained without any height differences, such that a top foil can be reliably sealed thereto. The arrangement of the top foil ensures that the tray obtains strength.

As the top seal foil is arranged on the circumferential flange, it is also easy to separate the plastic from the cardboard to discard the waste separately.

If the cardboard is made of sugar cane, the cardboard may even be disposed as biodegradable waste. The top seal foil could be made out of polyactic acid (PLA) such that the full packaging can be disposed of as biodegradable waste. However, a more common plastic for the seal foil will be a polyethylene (PE)—polyethylene terephthalate (PET) laminate.

In a preferred embodiment of the cardboard tray the first flange parts further comprise a third elongate flange part section, which third elongate flange part section is connected parallel and along an elongate edge to the second elongate flange part section and wherein the third elongate flange part section is adhered to the outside of the respective wall part.

With the third elongate flange adhered to the outside of the respective wall part, the position of the first flange part section is secured. Especially when a top foil is sealed to the circumferential flange, the third elongate flange prevents the first flange part section from being folded up, such that the sealed top foil remains under tension and sealed cardboard trays can easily be stacked.

The position at which the third flange part section is adhered to the outside of the respective wall part, allows for determining the angle of the first flange part section. By having the first flange part section hanging downwards, the tension on a top seal foil can be reliably maintained and even be increased. When the cardboard tray is arranged in a top sealer, the first flange part section will be urged towards a horizontal position, when the top foil is sealed to the flange. When the sealed tray is removed from the top sealer, the first flange part section will bend back towards the downwards hanging position, which will further tension the top seal foil.

The first, second and third flange part sections also provide strength to the tray, which allows for a reduction of the thickness of the unfolded cardboard sheet, for example to a thickness of only 300 micron. The reduced thickness has the additional advantage that heat penetrates the cardboard more quickly allowing for a faster connection of the overlapping parts of the second flange part section and the second flange part when a heat seal adhesive is used.

In this embodiment, the second flange parts are not required. For example, in trays for packaging fruit and vegetables, the top seal foil does not need to be adhered to a circumferential flange. When the foil is only adhered to the first flange parts and the top seal foil is tensioned due to the first, second and third flange part sections, then also a suitable tray is obtained, which can be stacked and wherein the fruit and vegetables are contained.

Preferably, the first elongate flange part section is sloping downwards from the respective wall part towards the second elongate flange part section.

The sloping first elongate flange part section allows for additional tension in the top seal foil, when arranged on the circumferential flange of the tray.

In a further preferred embodiment of the cardboard tray the width of the first elongate flange part section is larger than the width of the second elongate flange part section.

This ensures that when the first flange part is double folded, the second flange part section does not contacts the outside surface of the wall part and does not push the first flange part section upwards.

Preferably, the width of the second elongate flange part section is the thickness of the cardboard less than the thickness of the first elongate flange part section. Such width difference would typically be 0.5 millimeters or more.

In the embodiment, where a third flange part section is provided, the unfolded sheet can be arranged in an available folding machine, for example sold by Heiber and Schröder, which folding machine folds the first flange part double and adheres the third flange part section to the outside of the respective wall part. Due to the width difference between the first and second flange part sections, the first flange part section will automatically be bend downwards, such that additional tension in a top foil can be achieved.

In yet another embodiment of the tray the extending portions of the second flange part section are adhered to the second flange parts of adjacent wall parts.

By adhering the extending portions and second flange parts together, a strong flange is obtained also with the top seal foil removed from the circumferential flange.

An additional advantage of the double folded first flange part, is that the overlapping parts of the second flange part section and the second flange part can be provided with a heat seal coating or a suitable polyethylene laminate, which can be applied to the unfolded sheet from a single side. Once the folded cardboard tray is arranged in a top sealer and heat is applied to seal a foil to the circumferential flange, the coated overlapping parts are also subjected to heat and pressed together, such that a strong and rigid circumferential flange is provided, which allows for a top seal to be arranged under tension and which provides a strong cardboard tray.

In another embodiment of the cardboard tray adjacent wall parts are connected to each other by at least one overlapping glue flap arranged to one of the two adjacent wall parts and being adhered to the other of the two adjacent wall parts.

The connection via glue flaps provides further strength and rigidity to the tray of the invention.

In yet another embodiment of the cardboard tray corner parts are arranged between each of two adjacent wall parts and the bottom wall, which corner parts are folded double and adhered to one of the two adjacent wall parts.

The corner parts ensure that the bottom wall and wall parts can be folded out of an unfolded sheet, without providing any cuts. The resulting tray is therefore fully closed along the adjacent wall parts and along the wall parts and the bottom wall. So, a cardboard tray according to this embodiment will not leak due to the construction of double folded corner parts.

In a further preferred embodiment a plastic liner is arranged on the unfolded sheet and each double folded corner part is sealed by this plastic liner to one of the two adjacent wall parts.

The additional plastic liner further improves the leak-tight construction of the cardboard tray and allows even for storage of more fluid foodstuff. The plastic liner can also be used to adhere the double folded corner parts to the wall parts, such that an additional adhesive is not necessary.

In still a further preferred embodiment, the cardboard tray of the invention a top seal foil is arranged on the flange parts to cover the tray.

The invention also relates to a method for arranging a top seal foil on a cardboard tray, wherein a third elongate flange part section is provided, which method comprises the steps of:
 providing a top sealer;
 providing a cardboard tray according to claims 2 and 3, wherein the first elongate flange part section slopes downward towards the outer edge of the flange part;
 arranging the cardboard tray in the top sealer such that the first elongate flange part is pressed to an horizontal position;
 providing a top seal foil over the cardboard tray;
 sealing the top seal foil to the first and second flange parts.

By arranging the cardboard tray with downward sloping first elongate flange part section in the top sealer, the first flange parts will be urged towards a horizontal position. After the top seal foil is arranged on the circumferential flange and the tray is removed from the top sealer, the first flange parts will try to move back towards the downward sloping position causing additional tension in the top seal foil. The resulting trays with tensioned top seal foil are easily stackable, without damaging the content of the tray.

BRIEF DESCRIPTION OF THE DRAWING(S)

These and other features of the invention will be elucidated in conjunction with the accompanying drawings.

DESCRIPTION OF THE INVENTION

Figure 1:
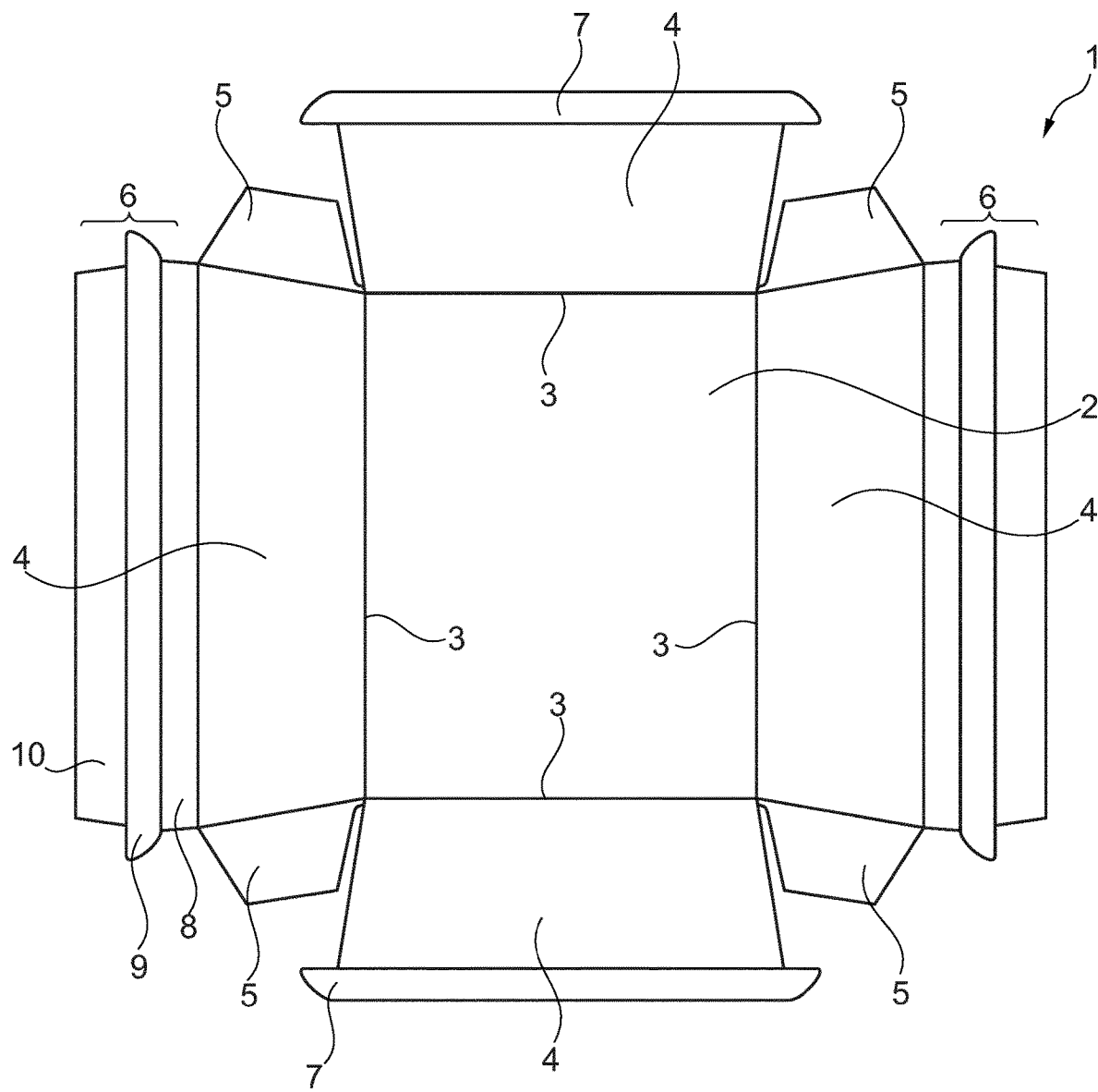
FIG. 1 shows a top view of an unfolded sheet for a cardboard tray.

FIG. 1 shows an unfolded sheet 1 for a cardboard tray. The unfolded sheet 1 has a bottom wall 2 with a circumferential edge composed out of straight edges 3.

Wall parts 4 are arranged to each straight edge 3. The wall parts 4 are provided with glue flaps 5 to connect adjacent wall parts 4 together.

The wall parts 4 are alternately provided with either first flange parts 6 or second flange parts 7. The second flange parts 7 are composed out of a single section, while the first flange parts 6 have a first flange part section 8 arranged to the respective wall part 4, a second flange part section 9 and a third flange part section 10.

Figure 2:
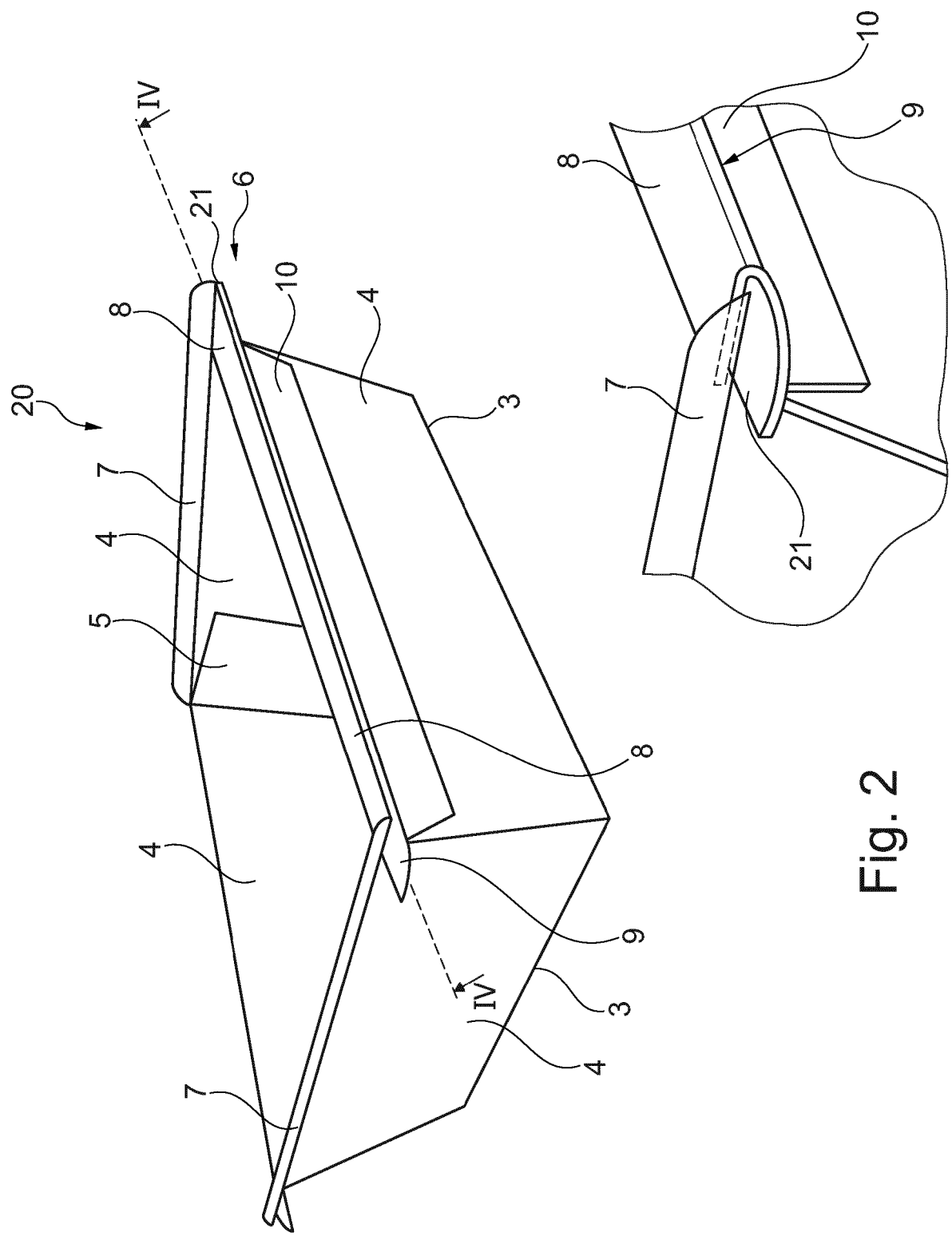
FIG. 2 shows in perspective view the unfolded sheet of FIG. 1 folded to a cardboard tray.

FIG. 2 shows in perspective view an embodiment of a cardboard tray 20 folded from the unfolded sheet 1 shown in FIG. 1.

The wall parts 4 are folded up and connected via glue flaps 5. The first flange part 6 has the second flange part section 9 double folded against the bottom surface of the first flange part section 8, while the third flange part section 10 is adhered to the respective wall part 4.

The second flange part section 9 has on both ends extending portions 21, which extend in longitudinal direction beyond the first flange part section 8. The extending portions 21 overlap with the ends of the second flange part 7.

Preferably, the overlapping parts of the second flange part section 9 and the second flange part 7 are coated with a heat seal coating, such that the overlapping parts can be adhered to each other with a top sealer.

Figure 3A:
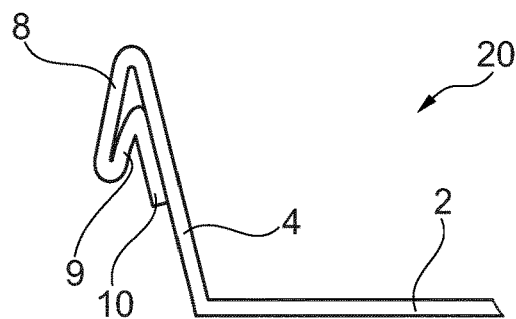
FIGS. 3A and 3B show a schematic cross-sectional view of the folding of the first flange part.
Figure 3B:
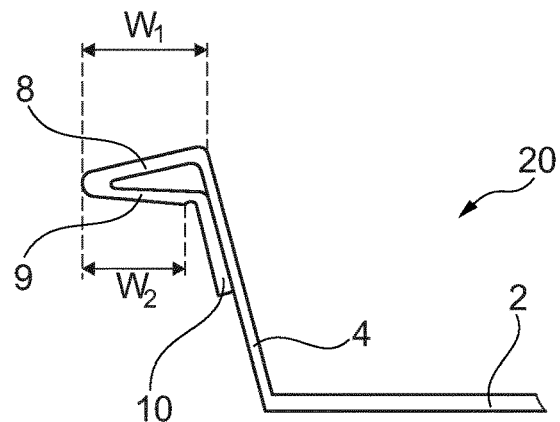

FIG. 3A shows how the first flange part 8, 9, 10 is folded using a conical erector device or conical gluing system, for example sold by the company Heiber and Schröder. The first, second and third flange part sections are folded into a Z-shape and the third flange part section is adhered to the respective wall part 4.

After the adhesive is set, the first and second flange part sections are bend towards a horizontal position. However, due to the width difference between the width $w_1$ of the first flange part section and the width $w_2$ of the second flange part section, the first flange part section remains sloping downwards towards the outside of the tray 20.

Figure 4:
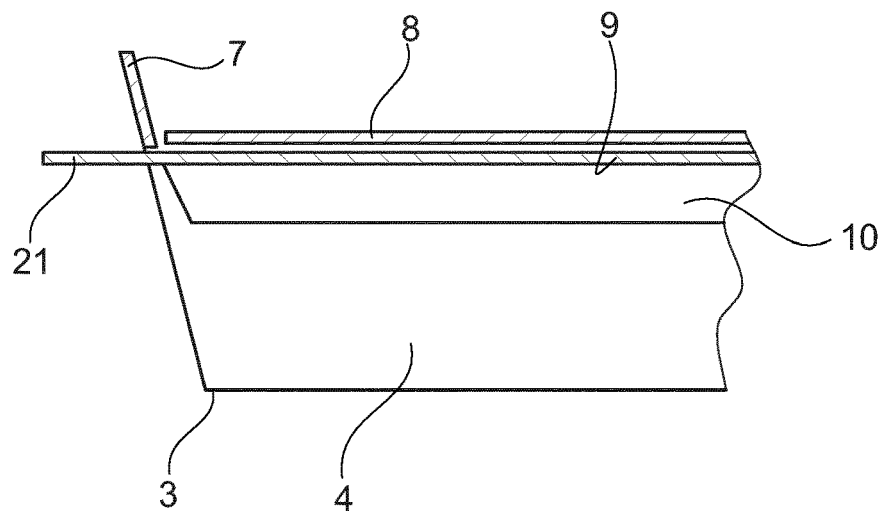
FIG. 4 shows a cross-sectional view along the line IV-IV in FIG. 2.

FIG. 4 shows a cross-sectional view along the line IV-IV in FIG. 2. The second flange part 7 is in line with the respective wall part 4. It is further clear that the extending portions 21 extend beyond the first flange part section 8, such that the second flange part 7 can be folded onto these extending portions 21 and that a circumferential flange is provided composed out of the second flange parts 7 and the first flange part sections 8.

Figure 5A:
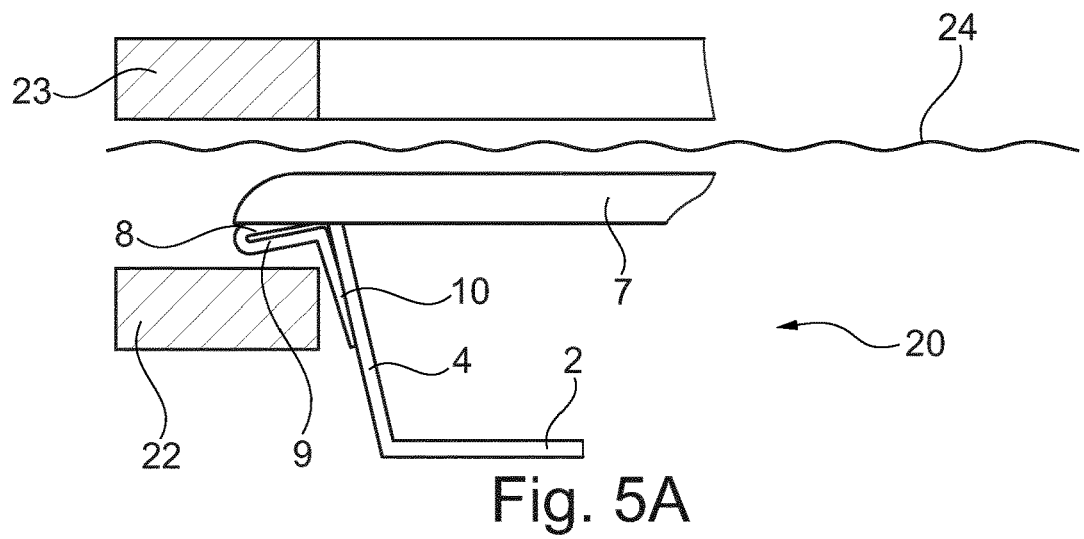
FIGS. 5A-5C show schematic cross-sectional views of the method.

FIG. 5A shows a first step of an embodiment of a method. A cardboard tray 20 as shown in FIG. 2, is arranged in a top sealer having a lower ring 22 and a top ring 23. Either or both rings 22, 23 are heated. A top seal foil 24 is furthermore provided over the tray 20.

The first flange part section 8 slopes downward, because the width of the first flange part section 8 is larger than the second flange part section 9, such that when the third flange part section 10 is adhered to the outside of wall 4, the first flange part section 8 is urged into a downward sloping position.

Figure 5B:
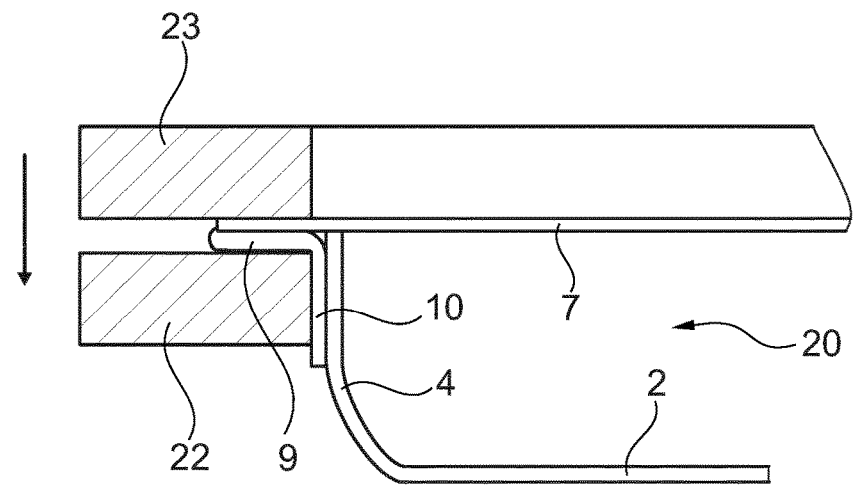
Figure 5C:
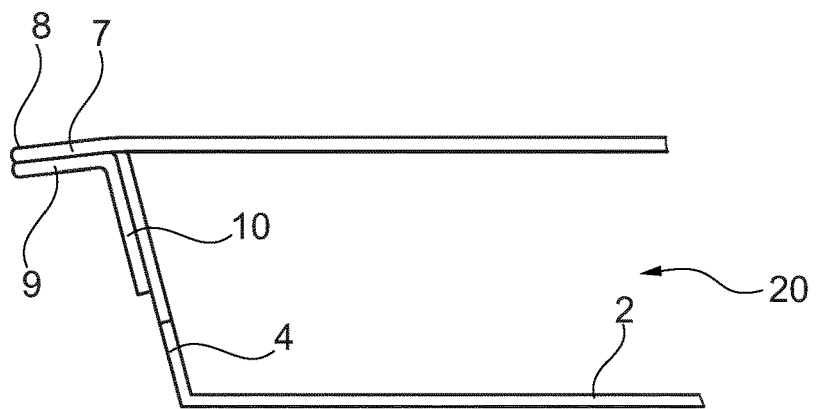

In FIG. 5B, both rings 22, 23 are pressed together, such that the first flange part 8, 9, 10 and the second flange part 7, as well as the top seal foil 24 are pressed together. This pressing action causes the first flange part 8, 9, 10, which generally slopes downward, to a horizontal position and the respective wall part 4 to bulge outwardly.

After sealing the top foil 24 to the first flange part section 8 and the second flange part 7, and after sealing the overlapping parts of the flange parts 6, 7, the tray 20 is removed as well as the pressure by the rings 22, 23. As a result, the bulging wall part 4 will straighten and the second flange part section 9 and the overlapping second flange part 7 will return to the downward sloping position, such that the top seal foil 8 is further tensioned, such that cardboard trays 20 can be stacked.

Figure 6:
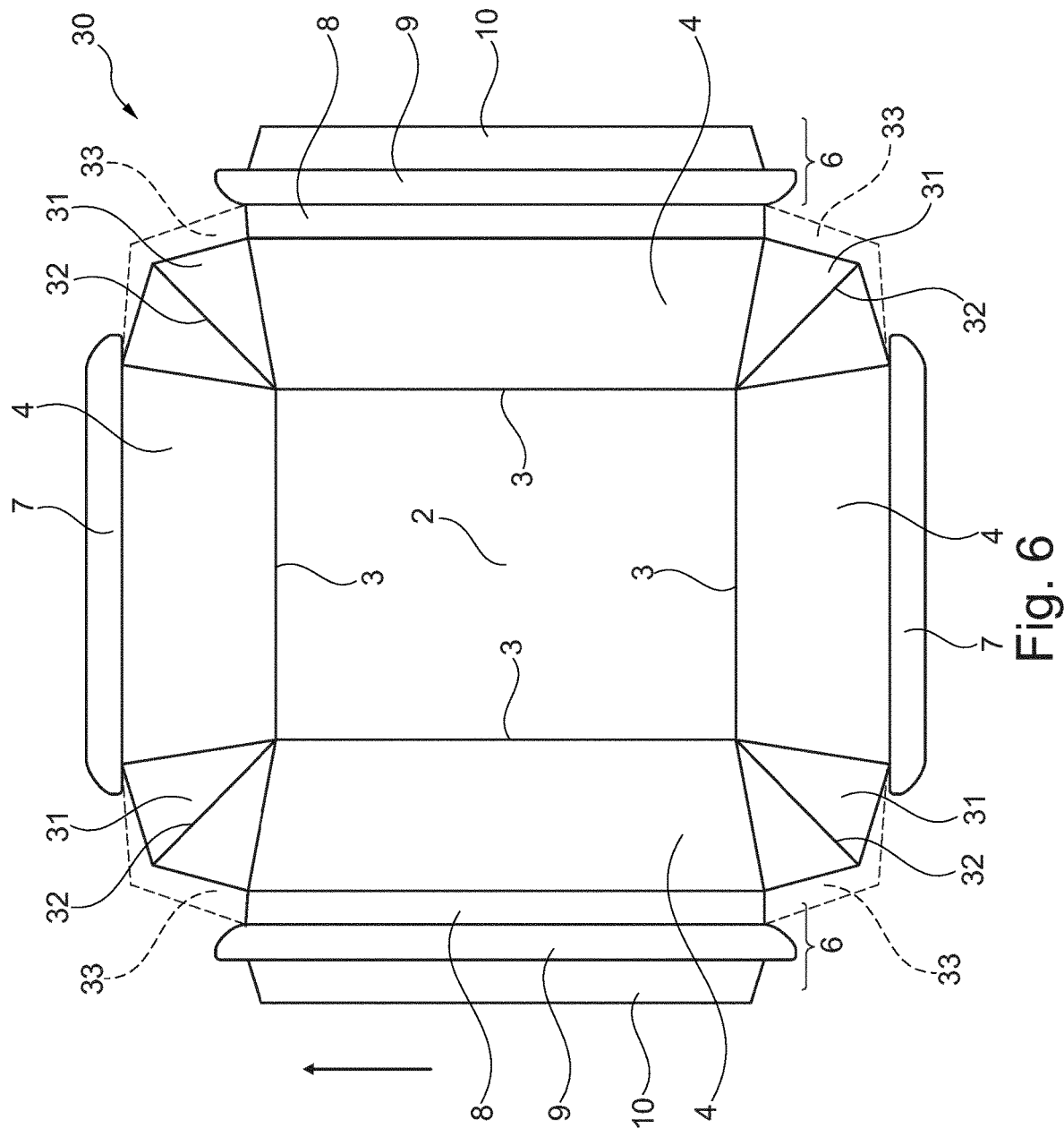
FIG. 6 shows a top view of an unfolded sheet for a second embodiment of a cardboard tray.

FIG. 6 shows a second embodiment 30 of an unfolded sheet, which can be folded into a box. The sheet 30 is similar to the sheet 1 as shown in FIG. 1 and similar features are designated with the same reference signs.

The unfolded sheet 30 has instead of glue flaps 5, corner parts 31 arranged between each of two adjacent wall parts 4 and the bottom wall 2. The corner parts 31 each comprise a folding line 32, which extends from the bottom 2. This allows for the corner part 31 to be folded double and against one of the adjacent walls 4.

As a result of the corner parts 31, a leak-tight tray is provided, when the unfolded sheet 30 is folded. Preferably, a foil 33 is laminated to at least the wall parts 4, the bottom wall 2 and the corner parts 31, such that even an airtight tray can be obtained.

The flanges 6, 7 are folded and adhered in the same way as with the unfolded sheet 1 and as explained with regard to FIGS. 1-5.

With the corner parts 31 a strong tray can be provided which allows for packaging a cake, which can be baked while being arranged in the tray. The strong walls due to the corner parts prevent bulging, such that a well-shaped cake will be obtained.

Figure 7:
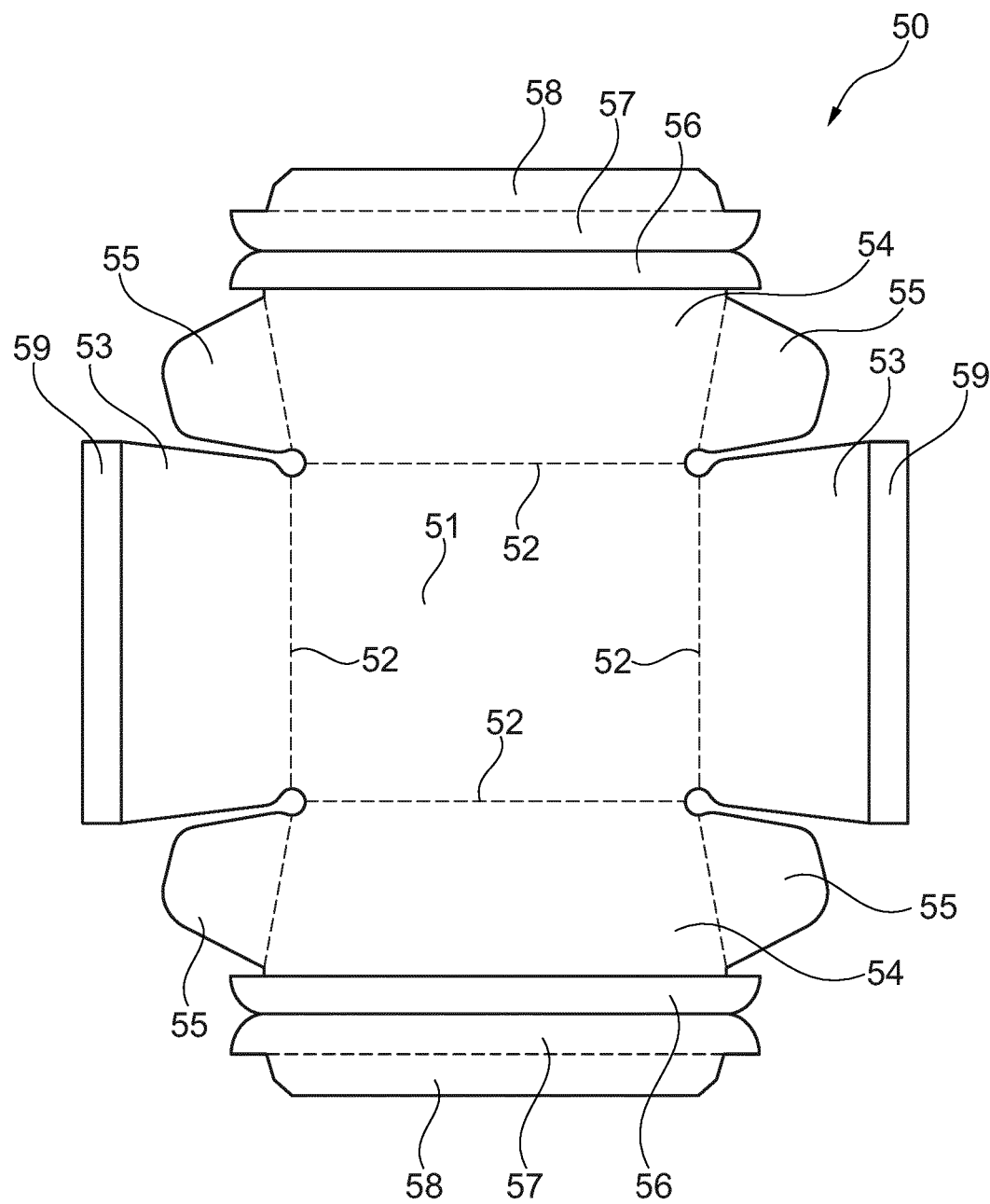
FIG. 7 shows a top view of an unfolded sheet for a third embodiment of a cardboard tray.

FIG. 7 shows a top view of an unfolded sheet 50 for a third embodiment of a cardboard tray, which unfolded sheet can be folded into a box.

The unfolded sheet 50 has a bottom wall 51 with a circumferential edge composed out of straight edges 52. Wall parts 53, 54 are arranged to each straight edge 52. The wall parts 54 are provided with glue flaps 55 to connect adjacent wall parts 53 together.

The opposite positioned wall parts 54, which are provided with the glue flaps 55, are also provided with first, second and third flange part sections 56, 57, 58.

When folding the unfolded sheet 50 to a box, the second flange part section 57 will be double folded against the first flange part section 56, while the third flange part section 58 will be folded against and adhered to the wall part 54.

The wall parts 53 are provided with a single flange 59, which will border the rounded ends of the first and second flange part sections 56, 57, when the sheet 50 is folded into a box. As a result, the single flanges 59 and the first flange part sections 56 will form a peripheral horizontal flange around the opening of the formed box.

When a top foil is sealed onto this peripheral horizontal flange, the flange part sections 56, 57, 58 will ensure that the foil is provided with tension, as described above, while the arrangement of the foil on the full peripheral horizontal flange will provide additional rigidity to the box. The adhering of the foil to the single flanges 59 further contributes to the rigidity of the sealed box. However, the single flanges 59 could also be left out, resulting in a box, which has less rigidity, but still has a tensioned foil.

The invention claimed is:

1. A method for arranging a top seal foil on a cardboard tray, which method comprises the steps of:
   providing a top sealer;
   providing a cardboard tray folded from an unfolded sheet of cardboard, the cardboard tray comprising:
      a bottom wall with a circumferential edge composed out of an even number of straight edges;
      wall parts each arranged to a straight edge of the bottom wall;
      first flange parts alternately arranged to subsequent wall parts along the circumferential edge, which flange parts are arranged to an edge of said wall part opposite of the respective straight edge of the bottom wall;
      wherein the first flange parts comprise at least a first, a second, and a third elongate flange part section, which are connected parallel and along an elongate edge to each other,
      wherein the first elongate flange part section is arranged to the respective wall part,
      wherein the third elongate flange part section is connected parallel and along an elongate edge to the second elongate flange part section,
      wherein the third elongate flange part section is adhered to the outside of the respective wall part, and
      wherein the second flange part section is double folded against the first flange part section, and
   wherein the first elongate flange part section slopes downward towards the outer edge of the flange part;
   arranging the cardboard tray in the top sealer such that the first elongate flange part is pressed to an horizontal position;
   providing a top seal foil over the cardboard tray; and
   sealing the top seal foil to the flange parts.

2. A method for arranging a top seal foil on a cardboard tray, which method comprises the steps of:
   providing a top sealer;
   providing a cardboard tray folded from an unfolded sheet of cardboard, the cardboard tray comprising:
      a bottom wall with a circumferential edge composed out of an even number of straight edges;
      wall parts each arranged to a straight edge of the bottom wall;
      first and second flange parts alternately arranged to subsequent wall parts along the circumferential edge, which flange parts are arranged to an edge of said wall part opposite of the respective straight edge of the bottom wall;
      wherein the first flange parts comprise at least a first and a second elongate flange part section, which are connected parallel and along an elongate edge to each other,
      wherein the first elongate flange part section is arranged to the respective wall part,
      wherein the second flange part section is double folded against the first flange part section, and
      wherein the second flange part section extends in longitudinal direction on both ends beyond the first flange part section and overlaps with the second flange parts of adjacent wall parts, and
   wherein the first elongate flange part section slopes downward towards the outer edge of the flange part;
   arranging the cardboard tray in the top sealer such that the first elongate flange part is pressed to an horizontal position;
   providing a top seal foil over the cardboard tray; and
   sealing the top seal foil to the flange parts.

3. The method of claim 1, wherein the first and second flange parts are arranged to an edge of said wall part opposite of and parallel to the respective straight edge of the bottom wall.

4. The method of claim 2, wherein the first and second flange parts are arranged to an edge of said wall part opposite of and parallel to the respective straight edge of the bottom wall.

* * * * *